Figure 1:
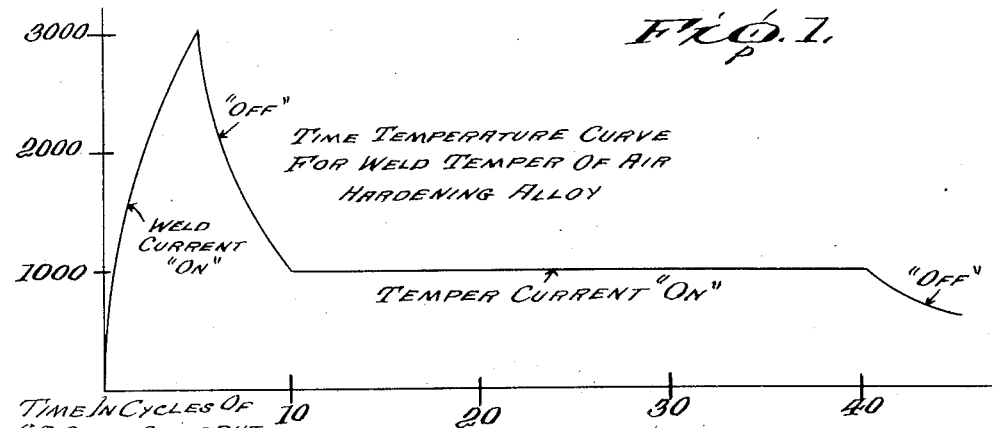

Nov. 11, 1941.  S. E. TUTTLE  2,262,705

ELECTRIC WELDING

Filed Aug. 7, 1939  2 Sheets-Sheet 1

LONGITUDINAL CROSS SECTION OF .18"D SPOT WELD WITH LOW STRENGTH AND TOUGHNESS 3.5X

LONGITUDINAL CROSS SECTION OF .18"D SPOT WELD WITH GOOD STRENGTH AND TOUGHNESS 3.5X

INVENTOR
Stiles E. Tuttle, deceased
By Clarence E. Tuttle, administrator
By John Howard Joynt
His Attorney Nov. 11, 1941.    S. E. TUTTLE    2,262,705
ELECTRIC WELDING
Filed Aug. 7, 1939    2 Sheets-Sheet 2

FRACTURE OF WEAK
BRITTLE WELD 2X

SAME AS FIG. 4. AT 10 X
SHOWING THE COARSE GRAINED
FRACTURE AT CORONA OF WELD

FRACTURE OF STRONG
TOUGH WELD 2X

SAME AS FIG. 7. AT 10 X SHOWING
THE FINE GRAINED FRACTURE
AT CORONA OF WELD

SAME AS FIG. 2
MID-SECTION AT 200X

INVENTOR
Stilas E. Tuttle, deceased
By Clarence E. Tuttle, administrator
John Howard Joynt
HIS ATTORNEY Patented Nov. 11, 1941

2,262,705

UNITED STATES PATENT OFFICE 2,262,705

ELECTRIC WELDING

Stiles E. Tuttle, deceased, late of Baltimore, Md., by Clarence E. Tuttle, administrator, Baltimore, Md., assignor to Rustless Iron and Steel Corporation, Baltimore, Md., a corporation of Delaware Application August 7, 1939, Serial No. 288,889

5 Claims. (Cl. 219—10)

My invention relates to the welding of hardenable alloys, especially to the spot welding of the hardenable stainless steels. By the term "hardenable" I am referring here and hereafter in this specification only to those alloys which are hardenable by heat treatment, for example by cooling from a temperature above the critical point, as opposed to alloys not hardenable by heat treatment but hardenable only by means of cold work, such as the austenitic chromium-nickel stainless steels.

One of the objects of my invention is to spot-weld alloy products in a simple, rapid and efficient manner to achieve a product with welds of uniform strength and ductility.

Another object is to spot-weld hardenable alloy irons and steels, especially the hardenable rustless irons and steels, in such manner as to achieve strong, tough welds of high durability and impact value which are substantially free of brittleness.

Another object is to produce welded products which are strong, ductile and free of brittleness by a spot-welding fabricating process without resorting to an annealing of the entire resultant product.

Other objects will be obvious in part, and in part pointed out hereinafter.

The invention accordingly consists in the several steps of operation and the relation of each of the same to one or more of the others, the scope of the application of the invention being indicated in the accompanying claims.

In the drawings:

Figure 1 is a time-temperature curve of a weld made according to my invention;

Figures 2 through 8 inclusive are photomicrographs of spot-welds illustrating certain features of my invention.

As conducive to a better understanding of certain features of my invention, it may be noted at this point that a spot weld is produced by clamping together two sheets of metal between electrode tips under a predetermined pressure. An electric current of low voltage and high amperage is then passed for a very brief space of time from one electrode tip to the other and through the two sheets, the direction of flow of the electric current being at right angles to the plane surfaces of the sheets. The passage of electric current causes fusion of metal lying along the axis connecting the two electrode tips. The metal immediately beneath the electrodes is not fused due to the high thermal conductivity of the latter. These electrode tips, incidentally, are commonly made of copper or a copper alloy which effects a rapid cooling of the heated and molten metal immediately after the electric current is discontinued. The rapidity of cooling of the weld metal is in most cases greater than the rate which prevails in the normal cooling of steel in air. For this reason certain alloys after spot welding will show a hardening effect which might not be evident under certain conditions of normal cooling in air.

The hardenable stainless steels, such as those containing in the neighborhood of 12% chromium, show hardening effects even when cooled in air in relatively large cross section. This is due to the sluggishness with which martensitic structures are converted into ferritic structures in passing through the critical point. Such steels as these have not hitherto been spot welded successfully due not only to their hardening properties but also to the fact that a hardened weld exhibits a rather high degree of brittleness.

Typical of such hardenable alloy steels are the rustless irons or steels with a chromium content ranging from 10% or less up to as much as 30%, perhaps with nickel additions up to as high as 6%. In such cases, carbon is present up to as high as 0.30%, this value of carbon increasing with higher chromium content, to ensure hardenability. These rustless steels are becoming more and more important today, and for example, find much use in chemical equipment, where higher chromium is employed, so that higher nickel and carbon contents are required for hardenability and strength. Molybdenum may be present in an amount up to as high as, say, 4%, in which instance the chromium content also is high.

Many steels which are normally considered to be only water or oil-hardening, that is, requiring a more rapid quench than air, are found to be hardenable when subjected to conventional spot welding practices. This is due to the high rate of cooling which occurs at the weld, a phenomenon to which reference has already been briefly made and which will be enlarged upon hereafter. Particularly is the hardening action emphasized when the spot welding electrodes are allowed to rest or dwell on the metal following the passage of welding current, the electrodes thereby rapidly conducting heat away from the metal and chilling and hardening it. This phenomenon has made known spot-welding technique unsuitable for such steels, as well as other steels known to be air-hardenable.

Accompanying the hardening of the air-hardening steels, there is a tendency towards embrittlement. This is especially pronounced in known spot welding practices and appears to vary with the composition and properties of the metal undergoing treatment. It is so severe in the cases of some steels that it has hitherto been considered to be impossible successfully to spot weld them. Investigation of certain of these steels, such as stainless steel, after they have cooled following the usual spot welding operation, shows that the weld bead is extremely dendritic with coarse grains progressing perpendicularly from the contact surfaces of the pieces welded. The weld bead is hard and brittle, as contrasted with the desired tough, ductile and small-grained structure of the parent metal back from the weld.

The brittleness of such welds may be further explained as a result of the relatively coarse, crystalline structure of the weld metal which, to a certain extent, corresponds to a rapidly cooled casting with a resulting coarseness of grain and unsatisfactory toughness and ductility.

Thus, there is justification for attributing this embrittlement to the nature of the solidification process and to the rapidity with which the weld metal is cooled after spot welding. Inherently electric welding, particularly of the spot welding type, is accompanied by a very steep temperature gradient between the weld or molten steel and the parent or solid metal immediately adjacent thereto. This is true even if a comparatively long interval of time is consumed in the process, and even if resort is made to preheating the parent metal. This steep temperature gradient is accompanied by rapid chilling of the weld section when the current to the electrodes is discontinued, the heat of the weld being very rapidly conducted away by the surrounding mass of parent metal.

The brittleness attendant upon spot welding of certain alloy steels in the conventional manner has been found to manifest itself in any one or more of several different manners. A decrease in the impact strength of the spot weld is observed. Also there is a decrease in the static tensile strength when the stress is applied at right angles to the plane of the weld. In extreme cases, actual cracks in the weld metal are noted. Apparently these form either during the cooling of the weld or shortly thereafter.

Brittleness and low ductility is manifested notably by the metal of the weld itself, but also, in some cases by the parent metal immediately adjacent the weld metal, that is to say, in the general region of the weld metal. When the weld metal alone is brittle, the problem presents its greatest difficulty when the sections of metal welded are of sufficient rigidity and stiffness to resist distortion when stress is set up in the weld metal. Thus real difficulty in this instance begins to arise when the thickness of the metal sections vary upwardly from about $\frac{1}{16}$ inch. With metal thickness in excess of this value, the resistance to distortion of the parent metal is such that when stress occurs in the weld metal, there is a tendency for separation at the weld, this separation taking place through the weld at the plane of contact of the sections welded. When both the weld metal and the adjacent parent metal have become embrittled, then even in the case of metal sections of light gauge, where normally all distortion under stress would lie outside the weld metal, difficulty is frequently encountered, due in all probability to the strains in the weld metal and in the surrounding parent metal being exerted in opposite directions.

Prior investigation leads to the conclusion that variation of welding technique of conventional type, such as manipulation of the time of the weld, the intensity of the current employed, and variation in the pressure of the electrodes, does not vary appreciably the degree or extent of weld embrittlement. Since spot welding is now a technique of considerable technical importance, rapidly replacing riveting in many instances, and being much more rapid and economical than other known processes of electric welding, the problem of successfully spot welding these air-hardenable steels is receiving more and more attention in industry.

An important object of my invention, therefore, is to avoid the disadvantages of known spot welding technique as it hitherto has been practiced, and to evolve a technique which will quickly produce a strong, tough and ductile weld in a simple, rapid and direct manner employing welding equipment of a rugged and comparatively inexpensive character.

In accordance with my invention, I have found that by subjecting the weld, once made, to a short annealing, tempering, or strain-relieving treatment I can produce pronounced changes in the strength, toughness, and ductility of the welded part, and when desired, in the actual structure of the embrittled weld metal itself, which changes in structure can even be extended to include the parent metal in the immediate vicinity of the weld.

Investigation of the loading conditions under which embrittled spot welds fail in practice leads to the conclusion that these are primarily due to static shear and to fatigue, or repeated loading. Rough handling, sudden blows or shocks, or accidental impacts may impose other stresses, for example impact shear or tension. These stresses are found to combine in unpredictable ways. I have found, however, that a static tension test is an entirely satisfactory measure of the toughness and ductility of a spot weld, and so I have employed this simple test for determining the criteria by which the success of my new method is measured. This static tension test is one wherein a weld is pulled apart by the steady application of force in an axis normal to the plane of the welded sheet.

As already suggested, my preliminary work led me to the belief that embrittlement of the weld was due to the presence of a dendritic formation of large, needle-like crystals in the region of the weld. The presence of these large crystals tends to explain, not only the brittleness of the metal, but also its weakness in static shear. Under the theory of local failure, particularly along intercrystal planes, failure under fatigue or repeated loads is also explained.

The formation of this dendritic structure can be avoided only with difficulty in the case where a single-dwell method of spot welding is employed. Dwell is a term which I employ to denote the period of passage of current through the current-carrying electrodes and the section of the parts being welded. Thus, in a single-dwell operation, the electrodes abut opposite surfaces of two overlapping pieces of sheet or strip metal, for example, and the current passes therethrough but a single time. I have evolved the technique, however, of subjecting the metal, once the weld is formed, to a subsequent heating treatment wherein weld and adjacent metal are brought to a temperature below the effective critical temperature of the steel, but sufficiently high to achieve the desired result. The metal is held at such temperature for an interval of time sufficient to bring about the desired release of welding strains and when desired sufficient to refine the dendritic structure to an appreciable degree.

In developing my novel welding process, I prepared specimen welds of stainless air-hardening steel strip by a conventional spot welding practice, and then, after the welds had cooled, reheated them by a lower electric current to a temperature of about 800° F. The welded joints were held at that temperature for about fifteen minutes. I found that this treatment produced a weld of static tensile strength of almost double that of the initial metal. However, viewed from a practical standpoint, the time required to complete the weld rendered the process prohibitive for use in industrial practices. My problem now became, how to evolve a technique giving rise to the desired advantages, and which at the same time was feasible from the standpoint of time required and efficiency of operation for use in industry.

With further experimentation, I found that by quenching spot welded specimens similar to those employed in my earlier experiments in a batch of salt raised to say 1100° F., for a period of about ten seconds, strains in the metal are released. The static tensile strength of the welded joints is increased to an extent even in excess of that obtained by the previously described electrical process. Thus, extremely valuable results are obtained by completing a spotweld of air-hardenable alloy steels in the usual manner, and thereafter, following solidification and at least partial cooling of the weld, quenching the welded joint from a temperature of approximately 1100° F., through a period of approximately ten seconds. It will be recognized, however, that such a tempering treatment is unsuited for use on products of large dimensions, and that its use in industrial practice is severely restricted.

For some time it appeared that any weld-temper process, to produce the effects in the metal which were sought, would require at least half-a-minute per weld, a time much too long for ordinary industrial practice. I now find, however, that these drawbacks may be overcome in an extremely simple, efficient, rapid and highly economical manner, which is entirely feasible for wide-spread utilization in industry. I find that if after the conclusion of the usual single-dwell spot-weld method, I permit the electrodes to remain or dwell on the metal, and then after a short period of cooling, reheat the weld to an elevated temperature for a short space of time, remarkably good results are obtained. The resultant weld is found to have, as compared to the single-dwell weld without subsequent heating, a decidedly increased static tensil strength, as well as greatly increased ductility, toughness and impact strength.

Since the temperature at which the tempering is carried out is lower than the effective critical temperature aforesaid, the tempering treatment can be accomplished almost immediately after the weld is formed, without at the same time encountering the danger of additional hardening of the weld upon cooling from the temperature of the tempering treatment. This treatment results in a toughening of the entire weld-affected area, including both the weld metal itself and the parent metal of the surrounding area. The hardness of the metal is decreased and its ductility increased. Internal stress in the metal are materially relieved.

In Figure 1 of the drawings is illustrated a theoretical time-temperature which may be involved in weld-tempering a typical air-hardening alloy. The curve is to be construed as purely illustrative, and is in no sense limitative. The curve is based on the use of a sixty-cycle, alternating electrical current, with the voltage reduced to a desired low value, say from five to fifteen or twenty volts.

Intense currents of from nine thousand to fifteen or even twenty thousand amperes or more are passed through the weld for the short period required for the actual welding to be accomplished. It is possible, where desired, to employ advantageously current values upwards of one hundred thousand amperes or more, although currents in excess of one million amperes cannot now be employed, because of limitations of present day equipment.

I find it highly desirable to follow the passage of weld current by a brief "off" period. During this time the current flow through the electrodes and across the metal is interrupted, the weld metal solidifying and cooling to a temperature approximately that at which the tempering step is to be carried out.

I now restore current flow, this time, however, at a current value much lower than that employed during the welding step, say from four thousand to six or seven thousand amperes. With the introduction of this current, the region of the weld is brought to and maintained at the desired tempering temperature for a time interval sufficient to remove strains in the metal and to impart thereto the desired degree of toughness and ductility. With this treatment, the region of the weld is given a tensile strength approaching or equaling, or perhaps even exceeding, that of the surrounding parent metal.

As suggested, the values employed in the curve of Figure 1 are entirely illustrative, and by no means limitative. For example, the duration of the welding step is shown as approximately five cycles, that is to say $5/60$ or $1/12$ of a second, sixty-cycle current being assumed. This welding time, however, may be decreased to as low as one cycle or even as low as one-half cycle, and conversely, it may be increased beyond the five-cycle span shown, although this is not desirable because of decreased economy and the loss of time, and the tendency toward obtaining a dendritic form of crystal structure.

Metal sections of all sorts may be successfully treated according to my new technique. These include sheet, strip, thin plate and the like as used, for example, in the fabricated parts of aircraft. The sections may be as thin as say 0.009 inch, or they may be of more important dimensions, extending to the limits of the definition of sheet and strip, that is, 0.141 inch. I find, however, that the desired duration of the welding current dwell depends somewhat upon the gauge of the metal undergoing treatment, so that in the case of heavier gauges, the time of the weld is increased to compensate for the additional heat losses resulting from the greater dissipating mass of metal which is present. This, of course, interposes some slight difficulty in bringing the metal to its welding temperature.

Similarly, the "off" period may be varied slightly, to suit the particular type of metals and the particular shapes being welded. It is highly desirable that this "off" period be adjusted so that the weld is cooled just sufficiently to bring it down to the desired tempering temperature. Further cooling is undesirable in that it represents a direct loss of energy, requires additional consumption of time, and results in a waste of energy in reheating the metal, during the first part of the tempering stage, to restore the weld section to the desired temperature of the tempering treatment. The "off" period is somewhat dependent upon the time of weld current dwell, in that where long weld current dwells are employed, this results in heating the region of the weld to higher average temperatures, requiring longer "off" periods to permit sufficient dissipation of heat to bring the region of the weld down to tempering temperatures.

The electrodes are permitted to remain on the metal sections during the "off" period. This not only simplifies the actual mechanical steps of the process, as contrasted to removing the electrodes at the end of the welding step and restoring them at the beginning of the tempering operation, but also serves to shorten the duration of the "off" period by rapidly conducting away heat in the region of the weld.

While a tempering span of approximately thirty cycles (one-half second) is indicated, this value, of course, can be departed from considerably, say as much as ten or fifteen cycles either way, depending upon the time actually required to relieve stresses and bring the weld to the desired permissible degree of toughness and ductility. Frequently, in practice, for example, I find it desirable to employ a tempering current dwell of about forty cycles.

A welding temperature of about 2900–3000° F. is depicted in Figure 1. While this is approximately the desired value, it may be varied several hundred degrees, without materially affecting the good bonding qualities of the weld, and without burning the metal.

Likewise, the tempering temperature is shown as being around 1000° F. This may be increased as desired to considerably higher temperatures, the maximum permissible temperature depending primarily upon the composition of the alloy in question. In the case of stainless steel containing less than .10% carbon and about 12% chromium the ordinary critical point is usually considered to be about 1425–1475° F. I have referred heretofore to the effective critical temperature of the steel undergoing treatment and this qualification is made for the reason that no reliable information is available as to the maximum length of time an alloy, such as 12% chromium stainless steel, may be heated at or slightly above the critical temperature without undergoing a hardening effect on cooling. It is entirely possible that very short periods of heating such steel at or slightly above the critical point may not lead to any hardening effect on cooling and, at the same time, the maximum annealing or tempering effect may be secured. It is to be understood, of course, that there is no practical way to measure the temperature of the metal lying between the welding electrodes.

Inasmuch as direct measurement of the temperatures in the region of the weld presents apparently insurmountable difficulties, I have found that trial and error methods of determining the proper weld-temper technique are quite satisfactory. The precise current values, the temperatures reached and the duration of current dwell best adapted to a particular steel of particular physical shape and dimensions can best be determined by experiment, initial experimental values being dictated by past experience. For example, a chrome steel weld has a higher electrical resistance than has ordinary carbon steel, and also has a lower thermal conductivity with attendant lower rate of heat dissipation, so that lower currents may be employed for such welds. I might add here, however, that the heating action of the high current values employed is very nearly the same in any metal, regardless of its precise coefficient of electrical resistance, because the heat produced varies as the square of the current, and only linearly with the resistance.

In the practice of my invention, I prefer to place the electrodes in opposition to each other, one on each side of the section to be welded. While any suitable welding electrodes may be used, I choose to employ electrodes of one and a quarter inch diameter, having rounded contact ends, which are turned about a radius of say three inches. These electrodes are forced with considerable pressure against the sections to be welded, preferably in the neighborhood of 400 pounds. The resultant contact area is found to be about 0.032 square inch. Simple calculation indicates the pressure density to be of the order of 12,500 pounds per square inch. I have found that for different desired current values, depending not only upon the intensity with which it is desired to carry out the welding step but also upon the metals undergoing treatment and the dimensions of the sections to be welded, the pressure with which the electrodes are applied against the work should be varied accordingly. This is desirable in order to ensure high current density in the region of the weld, to lower the electrical resistance of the weld, and to permit rapid conduction of heat away from the weld during the "off" period, that is, to ensure rapid cooling immediately after the weld step and give a short "off" period.

The size of the weld bead or spot is dependent not only upon the size of the electrodes employed but also upon the operating current density. Where larger weld spots are desired, the size of the electrodes may be increased. In order to maintain the current density practically constant, however, or else to increase it, if desired, the total value of the current passing through the electrodes is correspondingly increased.

Slight increase in the size of the weld spot also may be accomplished by increasing the pressure of the electrodes on the metal. This increases the area of contact, which in turn increases the area of the region of the weld. The increase of pressure of the electrodes on the weld, however, decreases the electrical resistance of the latter, and thus either diminishes the voltage required for a constant value of current, or else increases the current and thereby decreases the required time of the weld. This pressure may vary, for example, from 400 pounds for a 9000 ampere current flow up to say 1000 or 1500 pounds for a current flow up to say 20,000 amperes. In actual practice, however, lower pressures are desired, within reason, because in such cases the weld spot can be obtained more readily from a mechanical standpoint, the dies will have a longer life, and the metal can be slipped under the electrodes more readily and quickly, from one spot to the next. For currents of from 9,000 to 20,000 amperes and the electrode pressures indicated, the diameter of the weld bead is of the order of 0.2 inch. The current density, therefore, amounts to some 300,000 amperes per square inch or more.

I have also found that within certain limits, the time of the welding step can be varied, as suggested hereinbefore. Since a certain quantity of heat is necessary, at a certain temperature, in order to carry out the welding, the rate at which heat is supplied during this welding period must exceed by this amount the rate at which heat is dissipated through conduction and radiation.

Accordingly, if the duration of the welding step is diminished, then the current intensity must be increased, in order to ensure that sufficient heat is present, at the required temperature, to complete the welding in the shorter time span. With constant welding temperature, this means that the quantum of heat per unit of time must be increased, which in turn requires an increased current intensity, since temperature effect varies as a power function of the current.

Although as suggested, the welding step is carried out at high temperatures, in order to localize the weld and to bring the metal in the region of the weld to a state of fusion before the surrounding metal has an opportunity to respond, this condition does not maintain during the subsequent tempering treatment. As a matter of fact, in this latter case, a lower temperature gradient is desired, in order to bring the parent metal in the region of the weld up to the tempering temperature. It may be stated in general that in both the welding step and in the subsequent tempering operation, a proper balance must be obtained between the heat generated and that dissipated, in order to ensure proper welding and satisfactory tempering after the welding, and while the conditions of balance are different for the two cases, it is essential that this balance condition be obtained. I find that when the welding operation is carried out under high-current, short-dwell conditions, then tempering currents are required which are slightly higher than in the case of low-current, long-dwell welding. This situation is believed due to the fact that the parent metal in the region of the weld is not brought to the same high temperature during the welding in the case of the short-dwell as in the case of the long-dwell. In general, the tempering currents employed range from 4,000 to 7,000 amperes, giving current densities of some 230,000 amperes per square inch or less.

In the following tables I list certain data, part of which was obtained experimentally, and part of which is derived from the experimental data, illustrating a weld-temper treatment according to my invention as compared with a conventional weld treatment.

TABLE I

*Welding conditions*

| Sample number | Press. on elect. in pounds | Current in amperes | Time in current cycles | Diameter at weld in inches |
|---|---|---|---|---|
| A | 400 | 9000 | 4 | .18 |
| B | 400 | 9000 | 4 | .18 |

*Tempering conditions*

| Sample number | Off period in current cycles | Current in amperes | Time in current cycles |
|---|---|---|---|
| A | No tempering treatment. | | |
| B | 12 | 4200 | 40 |

TABLE II

*Static tension tests on welds of Table I*

| Sample number | Diameter in inches | Strength in pounds | Strength in lbs./sq./in. |
|---|---|---|---|
| A | .18 | 250–300 | 9,820–11,800 |
| B | .18 | 450–500 | 17,700–19,650 |

In the case of the experiments above described, measurement of the superficial hardness of the weld area after the tempering treatment showed values corresponding to 24–30 "C" on the ordinary Rockwell scale. Untempered material exhibited hardnesses varying from 32–40 "C" on the same scale. The material referred to in these illustrative examples was a low carbon stainless steel containing between 11 and 12% chromium.

In comparing the results of the single-dwell technique with those of the weld-temper treatment, it is apparent that a considerable improvement results from the tempering step, as dealt with more particularly hereinafter. This I have found to be true regardless of whether the initial weld was formed with low-current, long-dwell technique or by the use of a high-current, short-dwell method.

While my weld-temper method perhaps requires a slightly longer operating cycle than does the conventional single-dwell process, this increase in time is not a material detriment, welding speeds up to forty spots or more per minute having been obtained, and the resultant welds being vastly superior to those hitherto obtainable by the conventional methods now in use. As shown in the tables given above, welds in accordance with my method are much stronger than those made with conventional methods. Moreover, they are of better grain structure, are less brittle, have higher impact strength and the like as appears more fully below. In addition, as previously noted, alloy steels which have hitherto been thought to be impossible of successful spot-welding can now be satisfactorily welded by my new process.

To ensure welds which may be duplicated successfully from time to time, however, the value and dwells of the current must be substantially the same for the same size and kind of metal.

Figure 2:
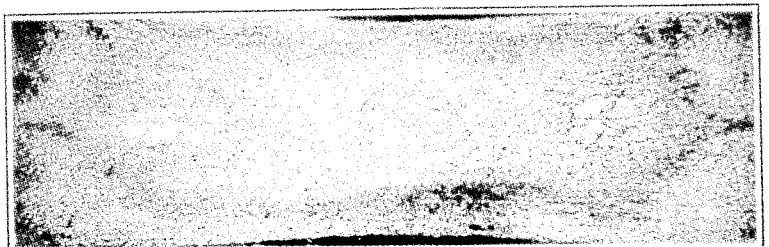
Figure 4:
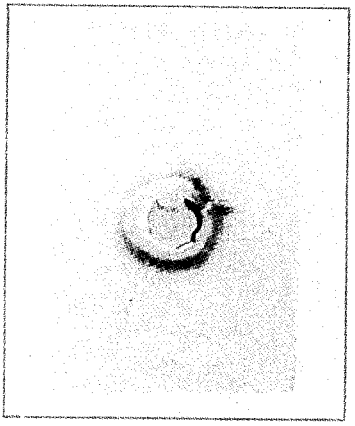
Figure 5:
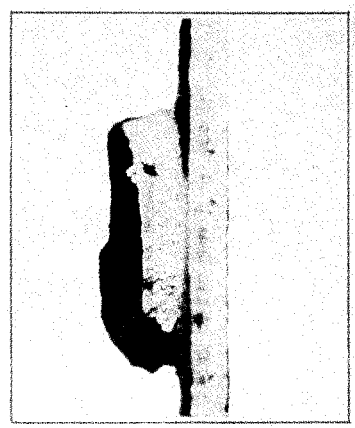
Figure 3:
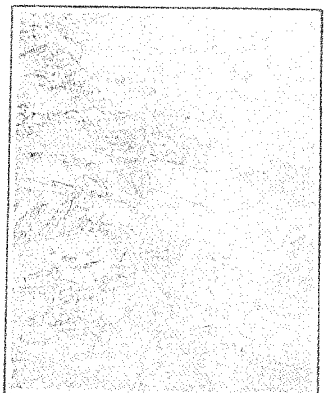

Certain of the properties imparted to the metals by my new process can best be illustrated by reference to the drawings. In Fig. 2, which a photomicrograph magnified to 35 diameters, there is depicted a weak and brittle weld, produced in an air-hardenable, rustless steel by the use of a conventional single-dwell welding technique. The weld is produced by passing nine thousand amperes across the metal during a four-cycle dwell and is some 0.18 inch in diameter. The weld displays upon air-hardening the objectionable dendritic structure. A smaller section of the same metal is shown in Figure 3, magnified to 200 diameters, and more clearly illustrates the needle-like martensitic crystals. It is to be noted that the section of the metal is very similar to that of a corresponding section through cast metal. These welds are brittle. Failure of the specimen in static tension is depicted in Figures 4 and 5, respectively, showing magnifications at 2 and 10 diameters. It is noted that failure of the specimen occurs in the corona of the weld. Figure 5 clearly illustrates the typical coarse grained structure at the fracture.

Figure 6:
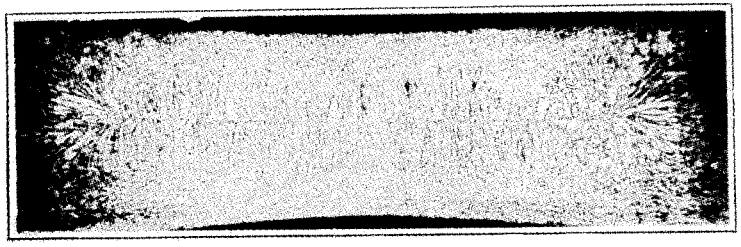

By contrast, in Figure 6 is illustrated at a magnification of 25 diameters a section through a weld according to my new weld-temper method. The diameter of the weld is the same as in the case of Figures 4 and 5, namely 0.18 inch, being produced by a current of 9000 amperes with a dwell of 4 cycles. This, of course, first gave the large-grained dendritic structure, typical of air-hardenable alloy steels as subjected to the conventional single-dwell, spot-welding technique as shown in Figure 2. The weld was subsequently cooled in the manner described, then tempered at forty-two hundred amperes over a forty-cycle dwell. Contrary to what might be expected from the large-grained structure of this specimen, the tempered weld exhibited considerable strength, showing a yield point in static tension of 450–500 pounds, or 17,700 to 19,700 pounds per square inch.

Figure 7:
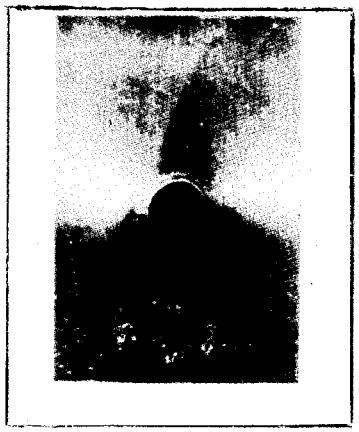
Figure 8:

In Figures 7 and 8, respectively, at magnifications of 2 and 10 diameters, is shown the manner of fracture of a strong tough weld produced according to my process. These figures illustratively point out the fact that failure is as much in the parent metal as in the weld. In point of fact, welds produced according to the technique of my invention are frequently found, when subjected to tests, to be more susceptible to failure in the surrounding metal than in the weld itself; that is to say, the welded joint is frequently stronger than the parent metal.

Thus, according to my new technique of spot-welding, employing a short tempering step immediately following the welding operation, the various objects of my invention together with many thoroughly practical advantages are obtained. Vastly increased and advantageous properties of strength, toughness and ductility are imparted to the weld. Moreover, it becomes possible to weld successfully many alloy steels which have hitherto been considered as being incapable of successful spot welding. My new technique can be employed without retarding the known spot welding practice to a detrimental extent, as measured by the standards of industry, and can be utilized with either manual or automatic manipulation or advance of the metal sections being welded. Very little additional equipment is required, and such additional equipment as is so employed is relatively inexpensive and simple in nature. The invention, therefore, is characterized by its extreme simplicity, efficiency and economy.

As many possible embodiments may be made of my invention, and as many changes may be made in the embodiments hereinbefore set forth, it will be understood that all matter described herein or shown in the accompanying drawing, is to be interpreted as illustrative and not as a limitation.

I claim:

1. In the spot-welding of sluggish, air hardenable ferritic and martensitic alloy steels, the art of producing a strong, tough and ductile welded junction between metal sections of the thickness of sheet and strip, which comprises the steps of, spot-welding the steel by passing an electric current of the order of 9,000 amperes or more through the same by means of electrodes on opposite sides of the steel, giving current densities of the order of 300,000 amperes per square inch or more, to raise the latter rapidly to temperatures at which welding quickly occurs, solidifying and cooling the weld by interrupting the current flow momentarily while retaining the electrodes in place on the steel, and thereafter reheating the weld to a temperature just below the critical temperature of the steel by passing current of reduced intensity through the electrodes and across the weld to carry out the desired tempering treatment.

2. In the spot-welding of sluggish, air-hardenable ferritic and martensitic alloy steels, the art of rapidly producing a strong, tough and ductile welded junction between metal sections of the thickness of sheet and strip, which comprises the steps of, spot-welding the steel by passing sixty-cycle current of the order of 9,000 amperes or more through electrodes on opposite sides of the steel for a duration of approximately one to five current cycles giving current densities of the order of 300,000 amperes per square inch or more, solidifying and cooling the weld by interrupting the current up to approximately twelve current cycles while maintaining the electrodes in position, and thereafter rendering the weld more tough and ductile by reheating the weld to a temperature below the critical point but sufficient to produce tempering by passing a current of the order of 7,000 amperes or less and at densities not exceeding about 230,000 amperes per square inch through the electrodes and across the weld for a period up to approximately forty-current cycles.

3. In the spot-welding of sluggish, air hardenable ferritic and martensitic alloy steel sheet or strip, the art of rapidly producing a strong, tough and ductile welded junction between metal sections, which comprises the steps of, placing electric current-carrying electrodes on opposite sides of the steel; applying pressures on the said electrodes of approximately 400 to 1,500 pounds giving pressure densities of some 12,500 pounds per square inch or more to ensure intimate contact of the electrodes with the steel and to tend to decrease the electrical resistance of the junction in the region of the weld; quickly raising the steel to its welding temperature and spot-welding it, by passing a current of some 9,000 to 20,000 amperes through the electrodes and across the steel giving current densities of the order of 300,000 amperes per square inch or more; solidifying and cooling the weld momentarily by interrupting the current flow while retaining the electrodes in place on the weld; and thereafter reheating the weld to a tempering temperature just below the critical point of the steel to produce tempering, by passing current of reduced intensity through the electrodes and across the weld to accomplish the desired tempering treatment.

4. In the spot-welding of sluggish, air-hardenable ferritic and martensitic rustless iron and steel sheet or strip sections, the art of rapidly producing a strong, tough and ductile welded junction between metal sections, which comprises the steps of, spot-welding the steel sections quickly at temperatures of the order of 3,000° F. employing an alternating electric current, solidifying and cooling the weld momentarily, and thereafter reheating the weld to a temperature just below the critical point of the steel to produce tempering, all with the welding electrodes in place.

5. In the spot-welding of sluggish, air-hardenable ferritic and martensitic rustless iron and steel sheet or strip sections, the art of rapidly producing a strong, tough and ductile welded junction between metal sections, which comprises the steps of, spot-welding the steel sections quickly employing an electric current of 9,000 to 20,000 amperes and an operating current density of some 300,000 amperes per square inch or more for a sufficient number of cycles to give a weld of desired size, solidifying and cooling the weld through continuing contact with the electrodes, and thereafter with electrodes in place, re-heating the weld to a tempering temperature employing a current of 4,000 to 7,000 amperes giving a density of some 230,000 amperes per square inch or less, to achieve a desired tempering treatment.

C. E. TUTTLE,
*Administrator of the Estate of Stiles E. Tuttle, Deceased.*